(12) United States Patent
Bakoledis

(10) Patent No.: US 6,634,852 B2
(45) Date of Patent: Oct. 21, 2003

(54) SHEET UNDERSTACKING FEEDING MECHANISM

(75) Inventor: Andrew Bakoledis, Chester, CT (US)

(73) Assignee: GBR Systems Corporation, Chester, CT (US)

( * ) Notice: Subject to any disclaimer, the term of this patent is extended or adjusted under 35 U.S.C. 154(b) by 91 days.

(21) Appl. No.: 09/941,921

(22) Filed: Aug. 30, 2001

(65) Prior Publication Data

US 2002/0060412 A1 May 23, 2002

Related U.S. Application Data

(63) Continuation-in-part of application No. 09/919,977, filed on Aug. 2, 2001, which is a continuation-in-part of application No. 09/902,996, filed on Jul. 12, 2001, now abandoned.

(51) Int. Cl.[7] ............................ B65G 57/30; B65H 31/30
(52) U.S. Cl. .................... 414/789; 414/788.9; 271/212; 271/211; 271/177
(58) Field of Search ................. 414/789, 789.1, 414/788.9; 271/212, 177, 3.03, 3.08, 3.09, 3.13, 211

(56) References Cited

U.S. PATENT DOCUMENTS

| | | | | |
|---|---|---|---|---|
| 1,671,790 A | * | 5/1928 | Staude | 271/212 |
| 1,960,382 A | * | 5/1934 | Koning | 271/3.03 |
| 3,280,679 A | * | 10/1966 | Huffman | 83/79 |
| 3,533,620 A | * | 10/1970 | Vasse | 271/212 |
| 3,871,539 A | * | 3/1975 | Nikkel | 414/802 |
| 3,888,587 A | | 6/1975 | Peri | |
| 4,067,568 A | * | 1/1978 | Irvine | 271/176 |
| 4,219,294 A | * | 8/1980 | Capdeboscq | 414/790.3 |
| 4,270,743 A | * | 6/1981 | Crampton | 270/58.3 |
| 4,354,336 A | | 10/1982 | Azzaroni | |
| 4,384,782 A | * | 5/1983 | Acquaviva | 399/373 |
| 4,478,404 A | * | 10/1984 | Garavuso | 271/212 |
| 4,514,958 A | | 5/1985 | Hoorn | |
| 4,539,794 A | | 9/1985 | Azzaroni | |
| 4,553,369 A | | 11/1985 | Debes | |
| 4,577,452 A | | 3/1986 | Hosel | |
| 4,590,738 A | | 5/1986 | Hosel | |
| 4,593,897 A | * | 6/1986 | Silverberg | 271/212 |
| 4,640,506 A | * | 2/1987 | Luperti et al. | 271/212 |
| 4,662,626 A | * | 5/1987 | Shores et al. | 271/305 |
| 4,692,083 A | | 9/1987 | LeRoux | |
| 4,759,679 A | | 7/1988 | Muller | |
| 4,775,138 A | | 10/1988 | Muller | |
| 4,781,371 A | * | 11/1988 | Stemmle | 271/293 |
| 4,783,588 A | | 11/1988 | Schmidt | |
| 4,788,810 A | | 12/1988 | Bauer | |
| 4,808,054 A | * | 2/1989 | Cuzin | 414/795 |
| 4,830,359 A | * | 5/1989 | Melnik | 271/306 |
| 4,949,608 A | * | 8/1990 | Ward et al. | 83/96 |

(List continued on next page.)

FOREIGN PATENT DOCUMENTS

| | | | | |
|---|---|---|---|---|
| DE | 1104310 | * | 4/1961 | 271/212 |
| DE | 21876 | * | 9/1961 | 271/68 |
| DE | 1141593 | * | 12/1962 | 271/86 |
| FR | 2288049 | * | 10/1974 | 271/177 |
| JP | 56-37958 | * | 4/1981 | 271/212 |
| JP | 56-37959 | * | 4/1981 | 271/212 |
| JP | 404173651 | * | 6/1992 | 271/212 |

Primary Examiner—Donald P. Walsh
Assistant Examiner—Daniel K Schlak
(74) Attorney, Agent, or Firm—Joseph J. Previto

(57) ABSTRACT

A feeding mechanism comprising an accumulating area mechanism for feeding sheets into the accumulating area to form a stack, exit mechanism, mechanism for moving the stack of sheets from the accumulating area through the exit mechanism, support mechanism are provided to keep the trailing edge of a previous sheet fed in the accumulating area uplifted until the leading edge of a subsequent sheet is moved beneath a previous sheet.

9 Claims, 2 Drawing Sheets

U.S. PATENT DOCUMENTS

| | | | |
|---|---|---|---|
| 4,957,409 A | * | 9/1990 | Fukao et al. .............. 414/788.4 |
| 5,092,576 A | * | 3/1992 | Takahashi et al. ......... 271/3.11 |
| 5,109,649 A | | 5/1992 | Azzaroni |
| 5,147,092 A | * | 9/1992 | Driscoll et al. .............. 180/6.5 |
| 5,383,656 A | * | 1/1995 | Mandel et al. ......... 271/258.01 |
| 5,462,265 A | | 10/1995 | Mandel |
| 5,545,001 A | | 8/1996 | Capdeboscq |
| 5,727,923 A | | 3/1998 | Michel |
| 5,851,008 A | * | 12/1998 | Dilanchian et al. ........ 271/4.07 |
| 5,913,514 A | | 6/1999 | Moser |
| 6,095,517 A | * | 8/2000 | Dinatale ..................... 271/212 |
| 2003/0012635 A1 | * | 1/2003 | Bakoledis ................ 414/790.3 |

* cited by examiner

SHEET UNDERSTACKING FEEDING MECHANISM

RELATED APPLICATION

This application is a continuation-in-part of U.S. patent application Ser. No. 09/919,977, filed Aug. 2, 2001 which in turn is a continuation-in-part of U.S. patent application Ser. No. 09/902,996 filed Jul. 12, 2001, now abandoned.

BACKGROUND

The present invention relates to a sheet and stack feeding mechanism and more particularly to a mechanism for accumulating sheets in a stack by understacking and discharging them as a stack.

In present high speed sheet feeding mechanisms, sheets are fed one by one to an accumulating area where sheets accumulate in a stack. When a certain number of sheets have been deposited in the stack, the entire stack is moved out of the accumulating area to another machine or to another portion of the machine. It is sometimes desirable to accumulate sheets in a stack to feed the sheets one on top of the other and at other times it is desirable to feed the sheets one under the other-commonly called understacking. Hence, it is desirable to have a mechanism which is sufficiently versatile to allow sheets to be fed to the accumulating area from the top or from the bottom. In existing machines, it has been difficult to do this without readjusting the entire machine. In some instances, separate machines are used to feed sheets one on top of each other and to undeerstack sheets. Moreover, existing machines do not have the versatility of permitting sheets to be accumulated one on top of the other or one beneath the other. Existing machines are complex to use and expensive to manufacture and maintain.

OBJECTS

The present invention overcomes these difficulties and has for one of its objects the provision of an improved sheet feeding mechanism in which sheets can be accumulated in an accumulating area one under the other.

Another object of the present invention is the provision of an improved sheet feeding mechanism in which a single machine can be easily converted to feed and stack sheets in an accumulating area one beneath the other or one above the other.

Another object of the present invention is the provision of an improved sheet feeding mechanism which is simple to use and inexpensive to manufacture and maintain.

Other and further objects of the invention will be obvious upon an understanding of the illustrative embodiment about to described, or will be indicated in the appended claims and various advantages not referred to herein will occur to one skilled in the art upon employment of the invention in practice.

DRAWINGS

A preferred embodiment of the invention has been chosen for purposes of illustration and description and is shown in the accompanying drawings forming a part of the specification, wherein.

DESCRIPTION

Figure 3:
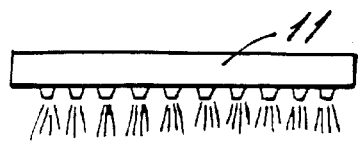
FIG. 3 is a schematic front view of a portion of the mechanism shown in FIG. 1.
Figure 1:
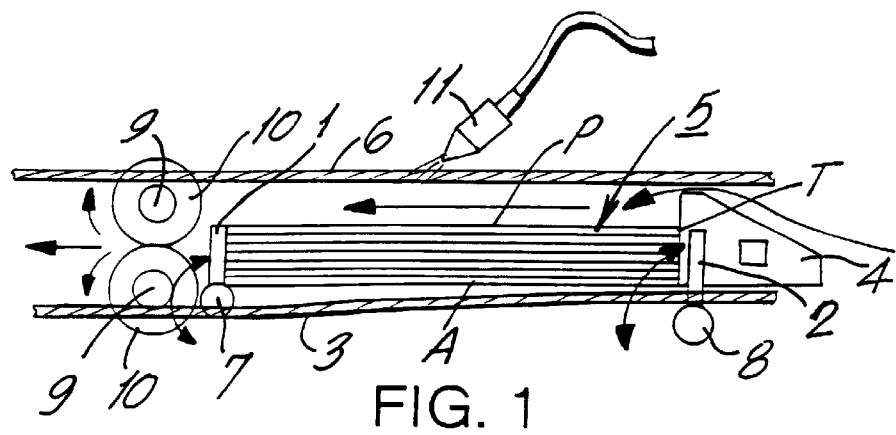
FIG. 1 is a schematic side elevational view of the present invention.
Figure 2:
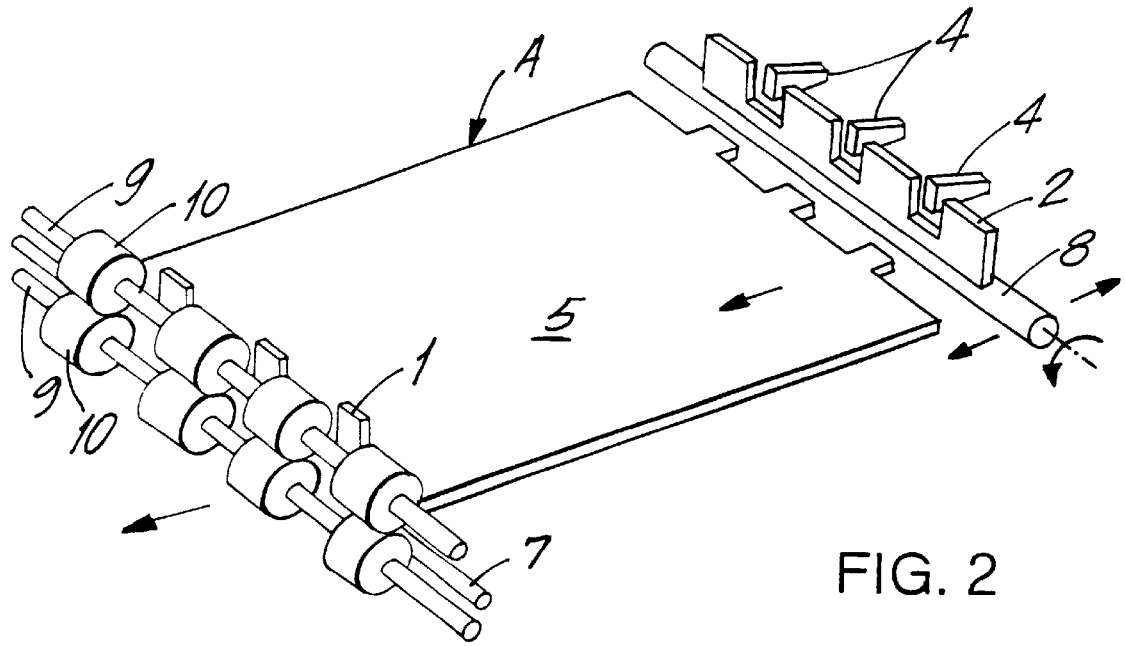
FIG. 2 is a schematic perspective view thereof.

Referring to the drawings and to the embodiment shown n FIGS. 1–3, sheets of paper P are fed one by one into an accumulating area A where they accumulate in a stack S. The accumulating area A comprises a front gate 1, rear pusher or kicker 2 and superimposed cables or rods 3 and 6 between which the sheets P are accumulated and a ramp 4 over which the sheets P pass. Alternately, the sheets P may accumulate on an accumulating bay or platform 5 (FIG. 2). In either event, there are no transport belts in the accumulating area A so that the sheets P are not continuously rubbed as they are being deposited.

A plurality of pairs of superimposed exit pinch rollers 10 are provided in front of the accumulating area A to direct the stack S from the accumulating area A to another portion of the machine (not shown). The front gate 1 is pivotally mounted on shaft 7 to swing back and forth from a raised position in front of the stack S to act as a gate or stop for the stack S of sheets P in the accumulating area A to a lowered position out of the way of the stack S so as to free the stack S of sheets P to move forward. The rear pusher 2 is adapted to swing back and forth on shaft 8 from a raised position behind the trailing edges T of the sheets P to a forward position where it strikes the trailing edge T of the stack S of sheets P to push it forward and through the exit pinch rollers 10 as a unit. The movement of the front gate 1 and the rear pusher 2 are coordinated so that when the rear pusher is swung forward to push the stack S, the front gate 1 is moved down and out of the way to allow the stack S to move forward. An air spray mechanism 11 may be provided across the top of the accumulating area A to provide an amount of air to tamp the sheets P and maintain the sheets P flat on the stack S as they are deposited thereon.

In front on the release gate 1 the exit pinch rollers 10 are rotatable on shafts 9 and are made of a resilient material which preferably may be a polyurethane resilient foam which has a low to medium density. They are resilient enough to be compliant or easily squeezed by thick stacks S but also have a coefficient of surface friction high enough to grasp and move the stacks S forward between them as a unit. These factors allow for transporting the stack S of printed sheets P through the exit pinch rollers 10 as a unit without smudging any of the printed sheets P. In addition, the compliancy and resilience of the foam of the exit pinch rollers 10 permit stacks of different heights to be moved through the exit pinch rollers 10 without the necessity of adjusting the distance between them. When a sufficient number of sheets P have been deposited in the accumulating area A, control means (not shown) sense the height of the stack and activate the pusher 2 and gate 1 so that the pusher 2 is swung forward to push the stack while the release gate 1 is swung down to free the stack for forward movement. The pusher 2 pushes the trailing edges T of the sheets P in the stack S to move the entire stack S (as a unit) out of the accumulating area A through the resilient exit pinch rollers 10 which grasp that stack S and move it forward.

Figure 4:
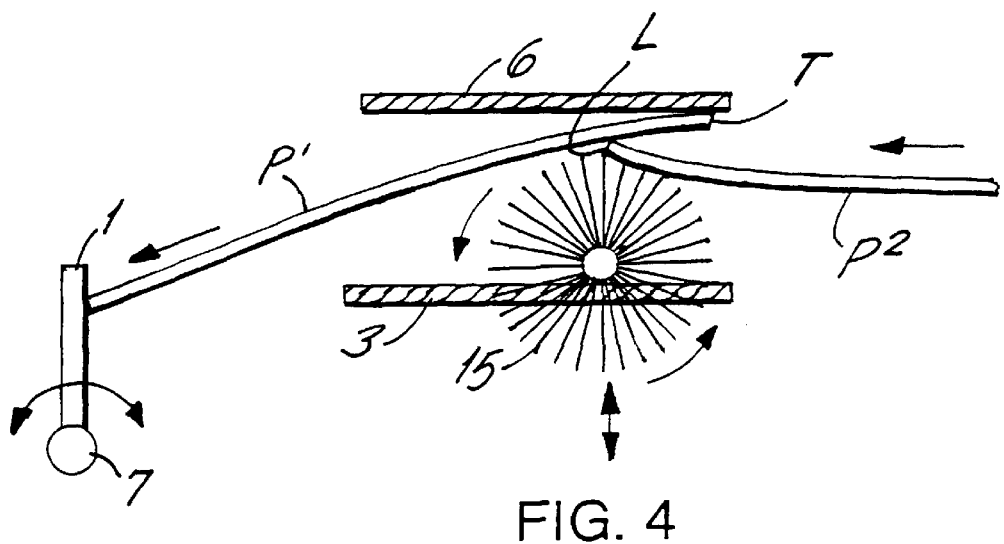
FIG. 4 is a schematic fragmentary side elevational view of another embodiment of the present invention.
Figure 5:
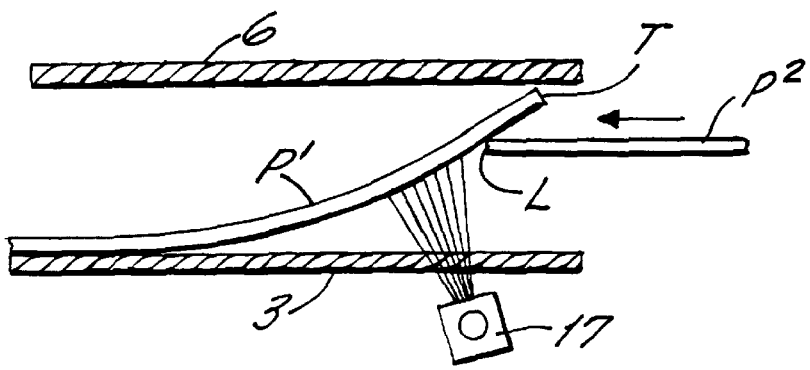
FIG. 5 is a schematic fragmentary side elevational view of another embodiment of the present invention.

Referring to the embodiment of FIG. 4, in which the reference characters used for some parts are the same as the reference characters used in the embodiment of FIGS. 1–3 for the same parts, the mechanism shown is adapted to permit sheets P to be stacked one under the other. A support mechanism, such as a brush 15, is provided in the accumulating area A and extends there into from the bottom. When a previous sheets p1 is moved into the accumulating area A, the brush 15 allows the leading edge L of the previous sheet p1 to pass through to the release gate 1 but holds the trailing edge T of the previous sheet p1 in a raised or uplifted position so that the leading edge of a subsequent sheet p2 can pass beneath the bottom of the previous sheet p1. This continues with each sheet being fed until the desired stack quantity is reached. The brush 15 can be a freely rotatable or stationary round brush. The brush may also be an angled straight brush 16 as shown in the embodiment of FIG. 5. In either instance, the brush 15 or 16 may be made of conductive material to eliminate static electricity. As another alternative, as shown in FIG. 6, an air knife or air brush 17 may be provided to direct air against the trailing edge T of the previous sheet p1 to keep the trailing edge T of the first sheet p1 in a raised position until the leading edge L of the subsequent sheet p2 is moved underneath it.

As shown in FIG. 4, the brush 15 is movable up and down relative to the accumulating area A. This permits the same mechanism to be used for stacking sheets P one on top of the other and for accumulating the sheets by understacking them one beneath the other. When the sheets P are to be stacked one on top of the other, the brush 15 is moved down out of the way and below the cable 3 so that sheets P moving into the accumulating area A will lie on the cable 3 and will accumulate one on top of the other. Since the brush 15 is down and out of the way, the sheets P will not strike the brush 15. However, when it is desired to understack the sheets and have the sheets accumulate one under the other, the brush 15 is raised so that now the sheets coming into the accumulating area A will strike the brush 15 and the rear end of a sheet P1 will be held in an elevated position until a second sheet P2 is fed into the accumulating area A under the first sheet P1. When it is desired to again accumulate sheets one on top of the other, the brush 15 is again lowered out of the way. Hence, this invention provides a mechanism with the versatility for stacking one on top of the other or one under the other.

A similar versatility is provided in the embodiment shown in FIG. 5, brush 16 may be pivoted from an upper position in the path of the sheets P or to a lower position below the cable 3 and out of the sheet path (not shown) so that the sheets P may accumulate one on top of the other. When the brush 16 is raised, the sheets accumulate one below the other.

Figure 6:
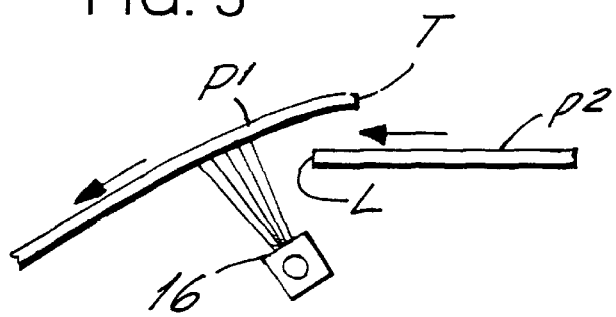
FIG. 6 is a schematic fragmentary side elevational view of another embodiment of the present invention.

The alternative shown in FIG. 6 is similarly versatile. If it is desired to accumulate the sheets one on top of the other, the air brush 17 may either be shut off or moved out of the way in order to permit the sheets to accumulate one over the other or the air brush 17 may be turned on or the air brush 17 may be moved back under the rear of the assembly area A so that it impinges on the rear edge T of the incoming sheets P and keeps the rear edge T of a first sheet P1 elevated until another sheet P2 is fed into the accumulating area A under a first sheet P1.

It will thus be seen that the present invention provides an imporved sheet and stack feeding mechanism in which sheets may be accumulated in the accumulating area one under the other, which may be easily converted to feed sheets one over the other or one below the other and which is simple to use and inexpensive to manufacture and maintain.

As many and varied modifications of the subject matter of this invention will become apparent to those skilled in the art from the detailed description given hereinabove, it will be understood that the present invention is limited only as provided in the claimes appended hereto.

The embodiments of the invention in which an exclusive property or privilege is claimed are defined as follows:

1. A sheet feeding mechanism for feeding sheets which have a leading edge and a trailing edge comprising an accumulating area having a rear end and a front end, means for feeding at least one sheet into said accumulating area, an exit mechanism, means for moving sheets from said accumulating area through said exit mechanism, said feeding means being adapted to feed a plurality of sheets into said accumulating area to form a stack of sheets, said moving means being adapted to move a stack of sheets through said exit mechanism, support means are provided to keep the trailing edge of a previous sheet fed in the accumulating area uplifted until the leading edge of a subsequent sheet is moved beneath the previous sheet, said support means are adjustable from a mode keeping said trailing edge uplifted to a mode not uplifting the said trailing edge and wherein said support means is a brush.

2. A sheet feeding mechanism as set forth in claim 1, wherein said brush is a round brush.

3. A sheet feeding mechanism as set forth in claim 2, wherein said round brush is rotatable.

4. A sheet feeding mechanism as set forth in claim 3, wherein said brush is made of a conducting material.

5. A sheet mechanism for feeding sheets which have a leading edge and a trailing edge comprising an accumulating area having a rear end and a front end, means for feeding at least one sheet into said accumulating area, an exit mechanism, means for moving sheets from said accumulating area through said exit mechanism, said feeding means are adapted to feed a plurality of sheets into said accumulating area to form a stack of sheets, said moving means being adapted to move a stack of sheets through said exit mechanism, support means are provided to keep the trailing edge of a previous sheet fed in the accumulating area uplifted until the leading edge of a subsequent sheet is moved beneath the previous sheet, said exit mechanism comprises a pair of exit rollers, a stack of sheets being adapted to pass between said exit rollers when moving through the exit mechanism, a pusher mechanism is provided adjacent the rear end of said accumulating area and means are provided adjacent the rear end of said accumulating area to activate the pusher mechanism to push a stack of sheets out of the accumulating area, said pusher mechanism activating means comprises means to swing the pusher mechanism back and forth from a position behind a stack of sheets in the accumulating area to a forward position to push a stack out of the accumulating area.

6. A sheet feeding mechanism as set forth in claim 5, wherein a release gate mechanism is provided in front of a stack being accumulated in said accumulating area and wherein means are provided to activate and move the release gate mechanism from in front of said stack to permit a stack of sheets to be moved out of the accumulating area.

7. A sheet feeding mechanism as set forth in claim 6, wherein sensing means are provided to sense the thickness of a stack and wherein said sensing means activates said pusher and said release gate mechanism.

8. A sheet feeding mechanism as set forth in claim 6, wherein sheets accumulate between at least a pair of superimposed cables.

9. A sheet feeding mechanism as set forth in claim 6, wherein ramp means are provided over which sheets pass before entering said accumulating area.

* * * * *